M. H. HARTER.
PORTABLE EXTENSION LAMP CORD ADJUSTER.
APPLICATION FILED JULY 24, 1916.
1,216,801. Patented Feb. 20, 1917.
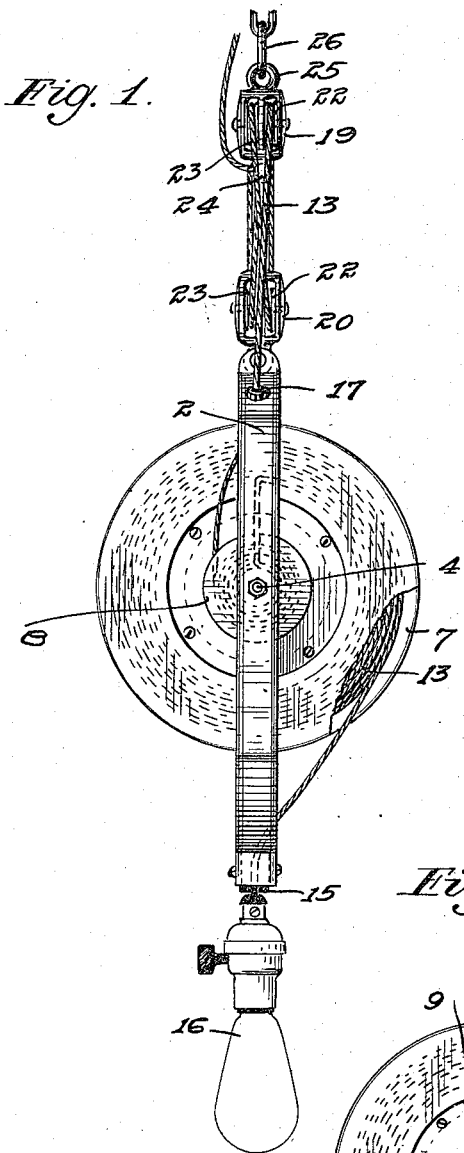
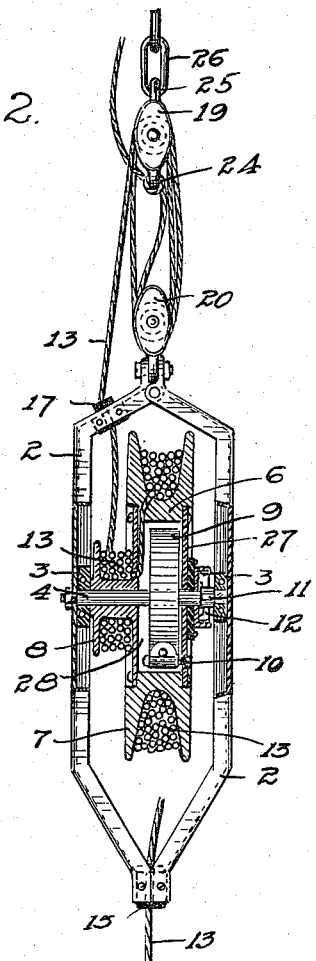
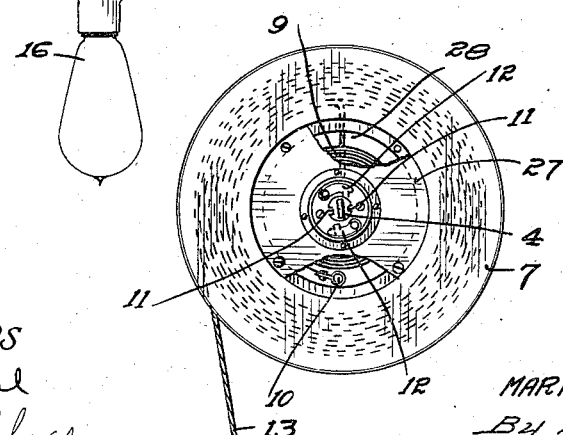
Witnesses
E. A. Paul
C. H. Rehfuss
Inventor
MARION H. HARTER
By his Attorneys
Paul & Paul

UNITED STATES PATENT OFFICE.

MARION H. HARTER, OF CANBY, MINNESOTA, ASSIGNOR, BY DIRECT AND MESNE ASSIGNMENTS, TO HANDY MANUFACTURING COMPANY, OF MINNEAPOLIS, MINNESOTA, A CORPORATION.

PORTABLE EXTENSION LAMP-CORD ADJUSTER.

1,216,801.   Specification of Letters Patent.   Patented Feb. 20, 1917.

Application filed July 24, 1916. Serial No. 110,909.

*To all whom it may concern:*

Be it known that I, MARION H. HARTER, a citizen of the United States, resident of Canby, in the county of Yellow Medicine and State of Minnesota, have invented certain Improvements in Portable Extension Lamp-Cord Adjusters, of which the following is a specification.

This invention relates to improvements in portable extension adjusters for lamp cords, and the object of the invention is to provide a device whereby the cord containing the electric wires for an incandescent electric lamp may be automatically wound up to shorten the length thereof, and unwound at will to increase the length, thereby permitting the lamp attached to the cord to be carried about from place to place within the limits of the length of the cord.

The invention consists generally in the constructions and combinations hereinafter described and particularly pointed out in the claims.

In the accompanying drawings forming part of this specification,

Figure 1 is a side elevation of a device embodying my invention,

Fig. 2 is a sectional elevation of a plane at right angles to that of Fig. 1,

Fig. 3 is a side elevation of the drum partly broken away to show the winding spring, and showing also the stop device.

In the drawing, 2 represents the frame of the device within which is journaled in bearings 3—3 a suitable shaft 4, and upon this shaft is mounted a drum 6, provided with the differential spools 7 and 8. The drum 6 is preferably hollow and has arranged within it a coiled spring 9. The outer end of this spring is attached to the drum by means of a pin 10, and the other end is suitably connected to the shaft 4. The end of the shaft is provided with a pair of notches 11—11, and the drum is provided with a pair of dogs 12—12. These parts are similar to those used on an ordinary window shade roller. The lamp cord 13 is wound upon the larger spool 7 of the drum 6 and passes through an opening preferably in the bottom wall of the spool and extends to and is wound upon the smaller spool 8. The free outer end of the cord 13 extends from the spool 6 downwardly through a guide 15 at the lower end of the frame 2 and has an electric lamp 16 connected thereto. The other end of the cord, after said cord has been wound upon the smaller spool 8, passes upward through a guide 17 in the frame 2, and is then preferably extended back and forth, or up or down, between the pulley blocks 19 and 20. Each of these blocks is preferably provided with a double set of pulleys and the cord 13 passes back and forth through the blocks 19 and 20, and around the pulleys located therein, any desired number of times according to the number of pulleys employed in each block. I have here shown each block provided with two pulleys 22 and 23, and the cord 13 passes from the guide 17 upwardly through the block 19 down through the block 20, again upwardly through the block 19 down through the block 20, and the free end is then preferably given a one-half hitch around an eye 24 on the block 19 and said cord is then extended to and connected with any suitable supply of electric current. The block 19 is preferably provided with an eye 25 to which a supporting chain 26 is connected.

I have represented the drum 6 as formed of wood with the plate 27 closing the opening 28 in which the clock spring is located, but this drum may be formed of metal or any suitable material.

I do not limit myself to any particular differential between the two spools formed in the drum 6. It will be understood that as the lamp cord is drawn down quite a length of cord will be drawn off from the spool 7. At the same time a much smaller amount will be released from the spool 8 and this will be distributed in the connection between the upper and lower blocks 19 and 20. The decrease is so great, however, that the amount of cord released from the spool 8 will cause a very slight lowering of the pulley 20 and the device supported thereby. I may employ any other suitable means for taking up the slack in the cord as it is released from the smaller spool.

I do not limit myself to the detail of the construction as the same may be varied in many particulars without departing from my invention.

I claim as my invention:

1. The combination, with a frame, of a drum provided with differential spools mounted in said frame, a spring for automatically rotating said drum in one direction, means for locking said spool in any desired position, an electric lamp cord wound upon both spools, the portion of the cord that is wound upon the larger spool being provided at its end with an electric lamp, and the cord that is wound upon the other spool being connected to a source of electric current, and means for taking up the slack of the cord that is unwound from the smaller spool, substantially as described.

2. The combination, with a frame, of a drum mounted in said frame and provided with differential spools, a spring arranged to rotate said drum in one direction, means for locking the drum in any desired position, an electric lamp cord wound upon both spools of said drum, one end of said cord being provided with an electric lamp, and a pair of blocks provided with pulleys, around and between which the free end of said cord extends, substantially as described.

In witness whereof, I have hereunto set my hand this 19 day of July 1916.

MARION H. HARTER.

Witnesses:
A. PAULSON,
H. C. BURMINGHAM.

Copies of this patent may be obtained for five cents each, by addressing the "Commissioner of Patents, Washington, D. C."